United States Patent [19] [11] 4,120,265
Davis [45] Oct. 17, 1978

[54] AQUARIUM DIVIDER

[76] Inventor: Thomas E. Davis, 666 Amber La., Apt. 101, Carol Stream, Ill. 60187

[21] Appl. No.: 742,868

[22] Filed: Nov. 18, 1976

[51] Int. Cl.² .......................................... A01K 64/00
[52] U.S. Cl. .................................................... 119/5
[58] Field of Search .................................. 119/3, 5, 35

[56] References Cited

U.S. PATENT DOCUMENTS

| | | | |
|---|---|---|---|
| 1,641,496 | 9/1927 | Kuhl | 119/5 |
| 3,255,731 | 6/1966 | Girard | 119/3 |
| 3,288,110 | 11/1966 | Goldman et al. | 119/5 |
| 3,512,503 | 5/1970 | Willinger | 119/5 |
| 3,854,450 | 12/1974 | Puckett | 119/5 |

FOREIGN PATENT DOCUMENTS 1,131,941  6/1962  Fed. Rep. of Germany ............. 119/5

Primary Examiner—Hugh R. Chamblee
Attorney, Agent, or Firm—Gary, Juettner & Pyle

[57] ABSTRACT

An aquarium tank having a bottom and four side walls is characterized by a transparent divider diagonally dividing the tank into two physically separate compartments, while maintaining the visual impression of a single compartment aquarium. The divider is vertical, rests on the bottom of the aquarium, and is of a height slightly greater than the level of water in the aquarium. The divider is clear and transparent throughout the major portion of the area thereof, and includes perforate areas adjacent its two ends for passage of water between the two compartments. Resilient mounting members at the two vertical ends of the divider provide a snug fit thereof into diagonally opposite corners of the aquarium. As a consequence of the physical separation of the compartments, newly born fry may be confined in one of the compartments safe from larger predatory fish in the other compartment.

2 Claims, 7 Drawing Figures

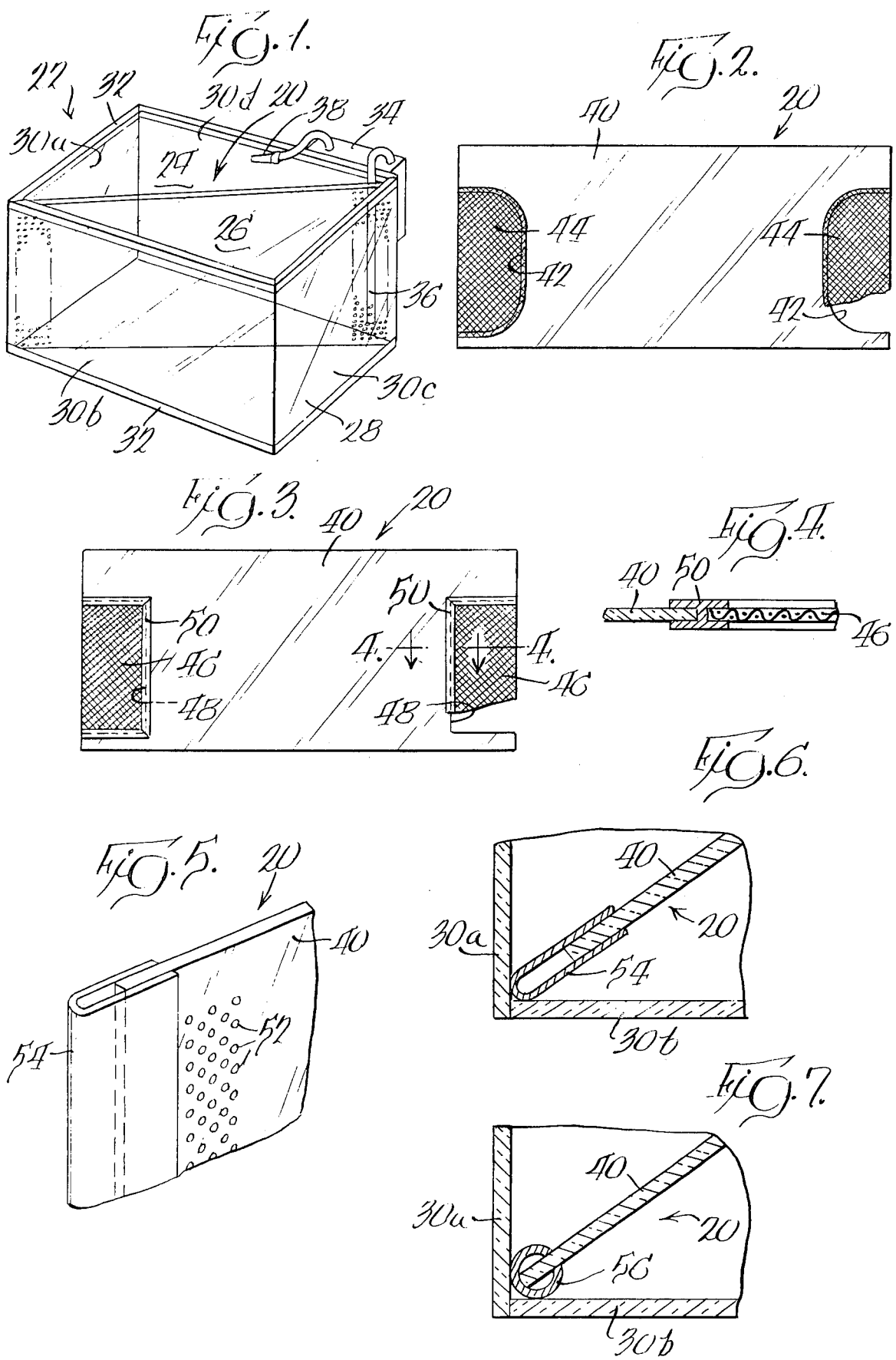

AQUARIUM DIVIDER

BACKGROUND OF THE INVENTION

The present invention relates to aquariums, and in particular to an aquarium tank having a divider for physically dividing the tank into two compartments while maintaining the visual impression of a single compartment aquarium.

A problem that arises when fish are maintained in a single aquarium is the protection of newborn fry or other small fish against larger predatory fish. Large fish instinctively feed on smaller fish, and some means must be provided for preventing consumption of the fry until they have had an opportunity to grow to a size sufficient to prevent them from being eaten.

The above problem was encountered by the inventor of the present aquarium divider, and may best be expressed in his own words.

Inventor's Experience

The idea came about because I had an aquarium with some fairly large fish and some medium sized fish. The medium sized fish became pregnant, so I went out and purchased a net type breeder, so the young could be born safely.

As the fry (young fish) began to grow, they were now becoming too big for the breeder, but they were still too small to be released with the larger fish, even their own parents, for fear of cannibalism.

I then went out and purchased the only aquarium "divider" I could find. It did not fill the needs I had. It was just a flimsy perforated piece of non-transparent plastic that barely stayed in place with undersized braces and it ruined the view of the tanks scenic backdrop.

I did not wish to become one of those aquarium affectionados who had an aquarium in every room of the house, so the idea of a "DIAGONAL SEE THRU-FLO THRU AQUARIUM DIVIDER" began to grow.

I knew right away it was a good idea (even if to myself only) so I pursued the idea only to "fix" my aquarium with one. At the time, (and at present), I was using an outside "DYNAFLO" filter which returns the filtered water via a nozzle at a considerable amount of force. This helped me to decide that it would be unnecessary to have the divider be perforated throughout. The force of the returning water would richochet off the glass corners of the tank and pass thru either a screen or hole punched clear material, with the width of the screen and holes being approximately 4 inches wide and running top to bottom at either end of the divider.

I thought of glass and plastic. I decided that for my needs I would use glass. I didn't feel like running all around to find a plastics firm because (1) I had noticed that some "clear" plastics become cloudy and (2) I didn't want to bother anyone.

I went ahead and took the inside dimensions of both my 10 GAL and 20 GAL AQUARIUM TANKS. I realized that if I was to utilize glass and a "screen", I would need some heavy type of support for the corners. It was then that I decided to let the glass run the entire length of the divider at both top and bottom with the top coming down approximately 2 inches and the bottom up approximately 1 inch, before the opened ends for the "screen" application.

From my high school drafting experience I drew a flat front view with the dimensions for both the 10 and 20 GAL AQUARIUM DIVIDER, I made the cutout portion about 4 inches into the ends with a circular corner top and bottom. I took these dimensions to a glass (house) shop and they cut the pieces for me. When I picked them up, I asked if they had any small pieces of aluminum screening. They did and gave me more than enough to fit the ends of both DIVIDERS.

Purchasing some aquarium cement, I fastened the already cut screen by overlapping the screening about ⅛ inch. It was at this time that I wished I was able to mold plastic so I'd be able to form a channel that would fit over the glass and hold the screening as a part of it, but for my own needs the cement was sufficient.

At this point (with screening glued to glass at both ends) the problem remained to effectively "seal" the ends of the divider (with glass at top and bottom-screening in the middle) to the corners of the aquarium. Still wishing I could mold plastic, I went ahead and used what was handy and would do the job.

Slitting a piece of plastic siphon hose (½ inch DIA.) down the side from top to bottom and cutting pieces to the height of the divider (2 per divider) I fashioned an end brace that was pliable and fit snugly into the corners, while forming a slot for both the glass and screened ends of each.

With the "home-made" divider in place in my own home, I was able to see first hand its possibilities. My friends and family would ask, "How can you keep those small fish with those big ones?" I'd say "they're not", and then explain the diagonal divider to them. Many liked the idea, so consequently, the thoughts of possibly getting a patent evolved.

It was not until I told a few fellow aquarium buffs of my idea and they're subsequent interest, that I decided to pursue this patent.

I knew of the need for a patent search and proceeded to do just that at the Chicago Public Library. For two Saturdays in a row I checked what I believed to be the proper class and subclasses.

The only item I found that closely resembled an aquarium "divider" was the one I purchased myself.

Now, my search only went into the aquarium CLASS 119 and its subsequent subclasses. I did search the design class for aquariums. It did not include the foreign patents, nor did I read any claims.

As time went on, I began to seriously pursue, the proper (what I believe to be), application of my item.

I picked up a book at the library, titled "The Inventor's Guide to Success".

With this book and it's underlying motivation that any idea has a strong possibility of being patentable, I began to take that possibility and apply it to mine.

I did a little research, by checking the shelves at least three pet shops for dividers. The only one I saw is the only one previously mentioned.

I then inquired at my local pet shop, if they had or knew of any other types of dividers on the market. The owner said "No", that the only one he's seen is the type I originally purchased.

This added to my enthusiasm. I asked a lawyer friend of mine if he knew of or could recommend any Patent Attorneys.

During this time I began to look deeper into the manufacture possibilities of my product. The only thing I did was to go back to my original concept of a single piece of clear material with punched or drilled holes, refined it, and added braces. This I wished to further refine to allow at least a 2 inch clear view at the top and a 1 inch solid bottom, before starting the holes.

OBJECTS OF THE INVENTION

The primary object of the present invention is to provide an aquarium having a divider which divides the aquarium into two physically separate compartments while maintaining the visual impression of a single compartment aquarium.

SUMMARY OF THE INVENTION

An aquarium having a bottom and four side walls includes a transparent divider which divides the aquarium into two physically separate compartments while maintaining the visual impression of a single compartment aquarium.

In the preferred embodiment of the invention the divider is vertical, rests on the bottom of the aquarium, extends between diagonally opposite corners thereof, and is a height slightly greater than the level of water in the aquarium. The divider is clear and transparent throughout the major portion of the area thereof, and perforate areas adjacent its two ends provide psssage of water between the two compartments. Resilient mounting members at the two vertical ends of the divider provide a snug fit thereof into the diagonally opposite corners of the aquarium.

The transparent divider thus provides two compartments for maintaining separate newly born fry or other small fish and larger fish which are natural predators of the small fish, without impairing the esthetic backdrop which is customary in aquariums.

Other objects, advantages and features of the invention will become apparent from the following detailed description when taken in conjunction with the accompanying drawings.

BRIEF DESCRIPTION OF THE DRAWINGS

FIG. 1 is a perspective view of an aquarium having a transparent divider dividing the aquarium into two separate compartments in accordance with the teachings of the invention;

FIG. 2 is a vertical front view of a divider having perforate areas adjacent its ends formed by screening cemented to a body portion of the divider over open areas thereof in accordance with one embodiment of the invention;

FIG. 3 is a vertical front view of a divider having perforate areas adjacent its ends formed by screening insertable into and removable from open areas formed in the divider body in accordance with another embodiment of the invention;

FIG. 4 is a view taken along the lines 4—4 of FIG. 3, and shows in cross section an H-channel bordering the screening to facilitate insertion thereof into and removal thereof from the open areas;

FIG. 5 is a partial perspective view of an end of the divider showing perforations formed through the body thereof in accordance with yet another embodiment of the invention, and also showing a resilient mounting member extending along the length of the edge for fitting the same snugly into diagonally opposite corners of the aquarium;

FIG. 6 is a partial, cross-sectional, plan view of the divider fit into a corner of the aquarium by the resilient mounting member shown in FIG. 5, and FIG. 7 is similar to FIG. 6, and illustrates the divider fit into a corner of the aquarium with another embodiment of a resilient mounting member.

DETAILED DESCRIPTION

The invention provides a clear and transparent divider for an aquarium which divides the aquarium into two physically separate compartments yet maintains the visual impression of a single compartment aquarium, is readily insertable into and removable from the aquarium, and provides at ends thereof perforate areas for a flow of water between the two compartments. With the use of the divider newborn fry or other small fish may safely be maintained in one of the compartments separate from larger predatory fish in the other compartment.

Referring to FIG. 1 of the drawings, the aquarium divider of the invention, indicated generally at 20, is shown positioned within an aquarium tank, indicated generally at 22, to divide the interior of the tank into two physically separate compartments 24 and 26. The tank includes a bottom wall 28 and four transparent side walls 30a–30d which, generally, are formed of glass. Edging strips 32 extend around the upper and lower edges of the sides, and as is conventional a water filtering and aerating unit 34 is provided to continually draw water from the tank through an inlet tube 36 and to reintroduce the water into the tank through a nozzle 38 after filtering and aeration thereof, whereby the water is maintained in a condition suitable to support aquatic life in the tank.

The divider 20 may be of any suitable clear, transparent material, such as of glass or plastic. In a preferred practice of the invention the divider is of glass, which is not susceptible to fogging or discoloration with exposure to the environment of the aquarium, is easily cleaned, is generally indiscernible to the naked eye, and otherwise maintains the visual impression of a single compartment aquarium. The divider extends vertically between opposite diagonal corners of the tank whereat resilient mounting means provide a snug fit between the ends of the divider and the corners, is of a height to extend slightly above the water level in the tank, and has perforate areas adjacent its two ends for passage of water between the two compartments. The perforate areas are of sufficient size to provide therethrough a free flow of water, yet are sufficiently small to block passage of the smallest fish. If desired, narrow horizontal slots may be formed through the divider just below the water level in the tank to further enhance movement of water between the compartments, whereby the compartment not associated with the nozzle 38 may receive continuously a supply of conditioned water.

Referring to FIG. 2, there is shown one embodiment of the divider 20 having a major body portion 40 of glass or other transparent material. Open areas 42 are formed in opposite vertical ends of the divider spaced from both the upper and lower edges thereof, and a mesh or screen like material 44 is positioned over each open area to close the area, when the divider is in the tank, to passage therethrough of the smallest fish, yet to provide for a free flow of water between the compartments. The screen may be positioned over the open areas by any suitable technique, such as by overlapping the edges of the screens on the body portion 40 and adhering the same thereto with aquarium cement.

FIGS. 3 and 4 illustrate another embodiment of the divider 20 wherein a mesh or screen like material 46 is removably positioned within rectangular open areas 48 formed in opposite vertical ends of the transparent body portion 40. In this case, edges of the screens are received within one slot in an H-channel 50, with an opposite slot in the channel being adapted to slidably receive edges of the body portion 40 around the open areas. With this structure the screens may readily be inserted into or removed from the open areas to facilitate handling and cleaning of the divider upon removal thereof from the aquarium.

FIG. 5 shows yet another embodiment of the divider 20 where perforate areas are provided adjacent opposite ends of the body portion 40 by forming an array of perforations or apertures 52 through the body portion at positions spaced from the upper, lower and side edges thereof. As with the screens, the perforations are of a size to prohibit passage therethrough of the smallest fish, yet permit a free flow of water between the compartments.

To snuggly fit and seal the two opposite ends of the divider into diagonally opposite corners of the tank, resilient mounting means is provided at each of the two ends of the divider. One such means, as shown in FIG. 5, may comprise a generally U-shaped resilient member 54 of plastic or other suitable material, which is preferably transparent to be esthetically compatable with the scenic interior of an aquarium. The member extends around the end of the divider along the entire height thereof, and is outwardly slidable with respect thereto. In this manner, with the divider positioned in the tank to rest on the bottom thereof, as shown in FIG. 6 the member 54 at each end of the divider may be moved outwardly thereof into snug engagement with the corners formed by the side walls of the tank to form a seal therewith and to maintain the divider in vertical position diagonally through the tank.

FIG. 7 shows another embodiment of resilient mounting members for snuggly fitting and sealing opposite ends of the divider into diagonally opposite corners of the tank. In this case, the members are tubes 56 slit along their length and positioned around the entire length of a respective end of the divider, the tubes forming snug seals with the corners when the divider is positioned in the tank.

In the use of the divider with the aquarium to form the physically separate compartments 24 and 26, the water level in the tank is controlled to be slightly below the upper end of the divider, thereby absolutely precluding any passage of fish or other aquatic life between the compartments. The perforations at opposite ends of the divider allow free passage of water between compartments to maintain a life sustaining environment within the compartments, and the transparent nature of the divider maintains a visual impression of a single compartment aquarium.

While embodiments of the invention have been described in detail, various modifications and other embodiments thereof may be devised by one skilled in the art without departing from the spirit and the scope of the invention, as defined in the appended claims.

I claim:

1. In an aquarium tank having a bottom and four side walls, a clear, transparent, diagonal divider physically dividing the tank into two compartments while maintaining the visual impression of a single compartment aquarium, said divider being vertical, resting on the bottom of the aquarium and being of a height slightly greater than the level of the water in the aquarium, said divider being clear, imperforate and transparent throughout the major portion of the area thereof and including perforate areas adjacent and along its two ends for passage of water back and forth between the two compartments into which the aquarium is divided, and resilient mounting members at the two ends of said divider for fitting the same snugly into diagonally opposite corners of the aquarium into which the divider extends, and including small slots along the top of the divider just below the level of the water in the aquarium for circulation therethrough of surface water, the remainder of said divider, except for adjacent said two ends, being imperforate.

2. In an aquarium tank having a bottom and four side walls, a clear, transparent, diagonal divider physically dividing the tank into two compartments while maintaining the visual impression of a single compartment aquarium, said divider being vertical, resting on the bottom of the aquarium and being of a height slightly greater than the level of the water in the aquarium, said divider being clear, imperforate and transparent throughout the major portion of the area thereof and including perforate areas adjacent its two ends for passage of water back and forth between the two compartments into which the aquarium is divided, and resilient mounting members at the two ends of said divider for fitting the same snugly into diagonally opposite corners of the aquarium into which the divider extends, said perforate areas being formed by slots or openings in the divider covered by screening, and including means for mounting said screening for insertion into or removal from said slots or openings.

* * * * *